Patented Oct. 9, 1923.

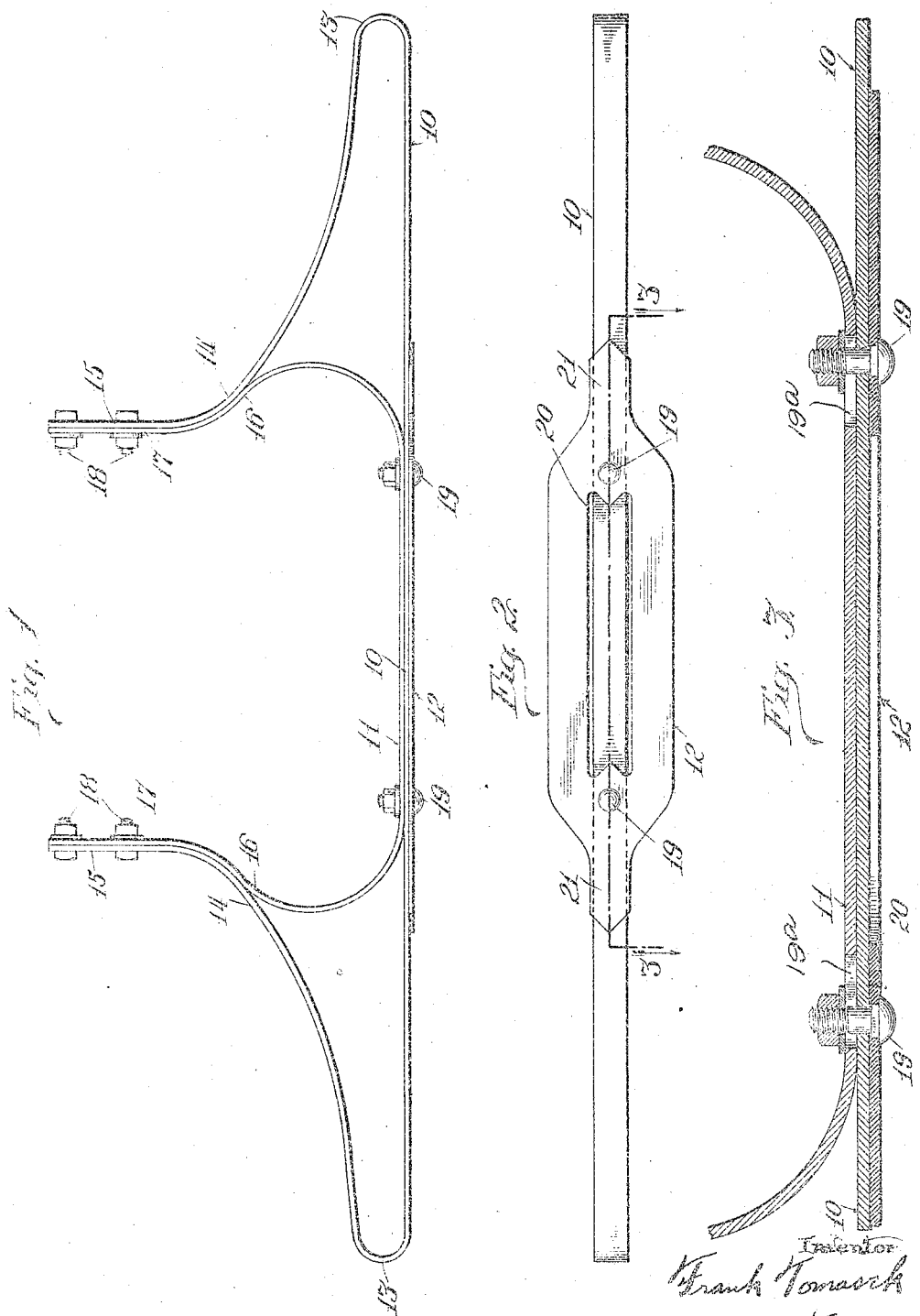

1,469,855

UNITED STATES PATENT OFFICE.

FRANK TOMASEK, OF CHICAGO, ILLINOIS.

AUTOMOBILE BUMPER.

Application filed September 16, 1922. Serial No. 588,913.

*To all whom it may concern:*

Be it known that I, FRANK TOMASEK, a citizen of the United States, residing at Chicago, in the county of Cook and State of Illinois, have invented certain new and useful Improvements in Automobile Bumpers, of which the following is a specification.

My invention relates to bumpers for automobiles, and has for its object the provision of a new and improved bumper consisting of a plurality of bars so formed and secured together as to provide a bumper that is relatively light in weight, yet sufficiently strong to withstand the rough usage to which automobile appliances of this character are subjected, which will be sightly in appearance, provide a relatively wide buffing surface, and which may be manufactured at a minimum cost.

The invention has for further objects the novel constructions, arrangements and combinations of parts hereinafter described and claimed, for carrying out the above stated objects, and such other objects as will appear from the following description of a preferred embodiment of my invention.

The invention is illustrated in the accompanying drawing wherein—

Fig. 1 is a plan view of an automobile bumper constructed in accordance with my invention.

Fig. 2 is a front view in elevation of the bumper illustrated in Fig. 1; and

Fig. 3 is a sectional view taken on line 3—3 of Fig. 2, and illustrating, on a somewhat larger scale, the structural details of the center portion of the bumper.

Like characters of reference designate corresponding parts in the several figures of the drawing.

Referring to the drawing, my improved bumper is shown as consisting of a relatively long outer bar 10 of spring metal, a shorter inner bar 11 of spring metal, and a relatively wide buffing plate 12. The outer spring bar 10 is bent intermediate its ends, as indicated by the reference numerals 13, 13, and the end portions are curved inwardly and rearwardly, as indicated by numerals 14, 14, and terminate in relatively straight portions 15, 15, which are normally at substantially right angles to the front face of the outer bar. The inner bar is, preferably, somewhat shorter than the outer bar 10, and is provided with a flat face which is secured to the central portion of the outer bar. The ends of the inner bar are bent rearwardly to provide reverse curved portions 16, 16, corresponding in part to the contour of the curved portions 14, 14, of the outer bar and terminate in straight portions 17, 17, adapted to be secured to the ends of the outer bar by bolts 18, 18. The straight ends 15 and 17 of both spring bars are adapted to be attached directly, or by means of brackets (not shown) to an automobile chassis so as to support the bumper in a horizontal position across the front, or the rear, as may be desired, of the automobile.

The buffing plate 12 is, preferably, though not necessarily, made of spring metal and consists of a relatively wide bar removably secured to the flat face of the outer spring bar near the middle thereof, by bolts 19, 19, which bolts extend through elongated openings 19ª—19ª in the inner spring bar 11 and rigidly clamp the buffing plate 12 to the outer spring bar 10 and clamp the said outer and inner spring bars together with capacity for longitudinal movement of the buffer plate and outer spring bar with relation to the inner spring bar. The central portion of the buffing plate 12 is cut away as indicated by the numeral 20 and the end portions are reduced in width, as shown by numerals 21, 21, to substantially the same width as the outer spring bar 10.

With such construction the buffing plate 12 provides a relatively wide buffing surface, and thereby minimizes the likelihood of the bumper, in the event of a collision with another automobile, passing above or below the bumper of said other automobile, and at the same time does not appreciably increase the weight or the cost of manufacturing the bumper.

The buffing plate 12 may be readily removed from the spring bar 10 for the purpose of repairs, or if it be provided with a polished or nickel-plated surface, to polish or re-nickel without removing the entire bumper.

I claim:

1. An automobile bumper comprising a relatively long spring bar bent to provide rearwardly projecting end portions adapted to support said bar in a horizontal position across an automobile, a shorter inner bar of spring metal bent to provide rearwardly projecting ends, and adapted to be secured to the ends and middle portion of the said outer bar, and a relatively wide buffing plate removably secured to said outer and inner bars with capacity for normal relative movement between said inner bar and buffing plate.

2. An automobile bumper comprising an outer bar member of spring metal bent intermediate its ends to provide ends which curve inwardly and rearwardly, an inner bar member of spring metal bent to provide reverse curved portions, a part of which, in each case, conforms to and fits against a curved portion of said outer bar, a relatively wide buffing plate formed with relatively narrow end portions and with a central elongated opening, and means for securing said buffing plate to said outer and inner spring members.

FRANK TOMASEK.